Feb. 23, 1943.  N. KOROTZER  2,312,175
STRING MODEL OF A FRUSTUM OF A CONE
Filed Jan. 23, 1941  3 Sheets-Sheet 1
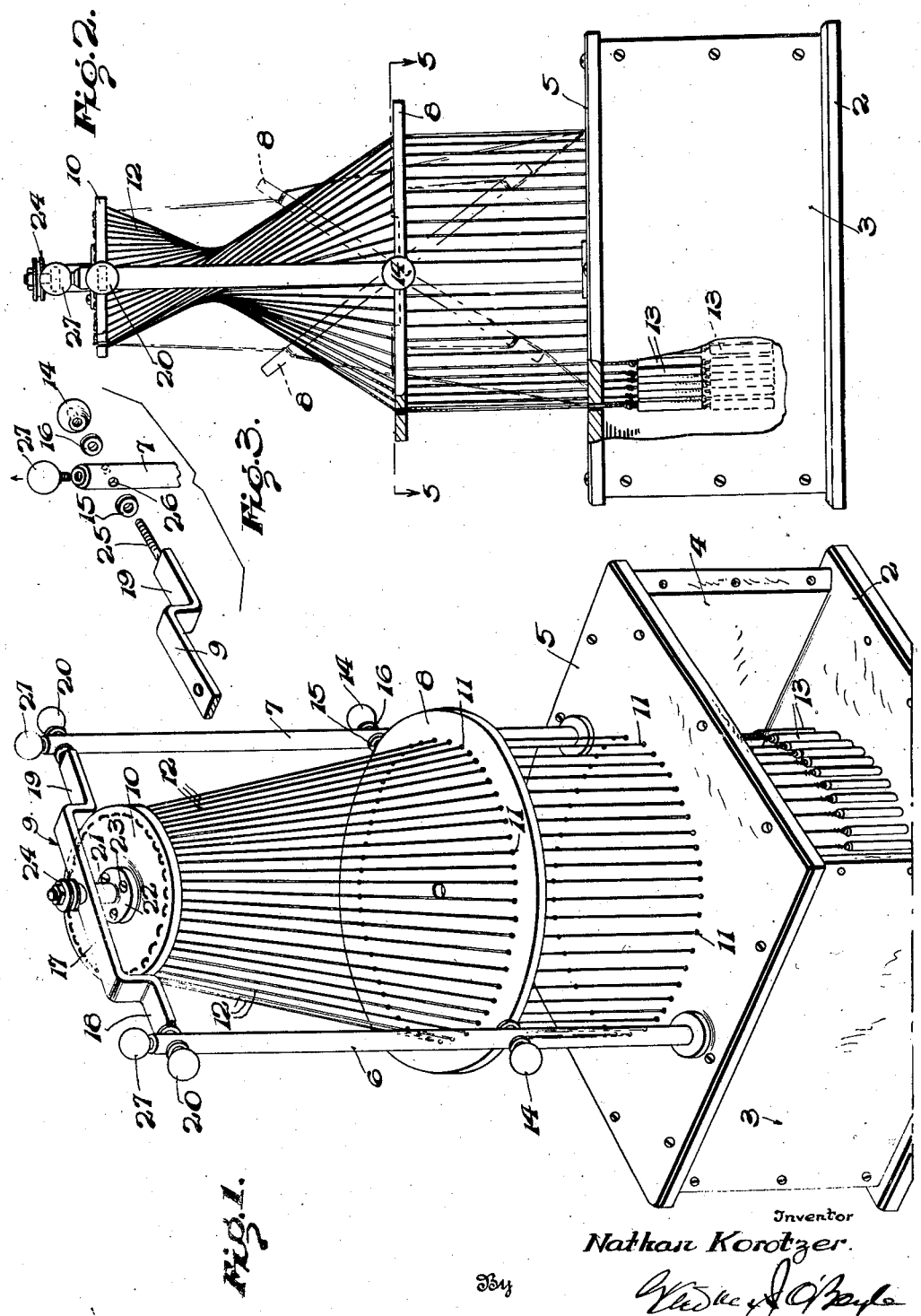
Inventor
Nathan Korotzer.
By
Attorney Feb. 23, 1943. N. KOROTZER 2,312,175
STRING MODEL OF A FRUSTUM OF A CONE
Filed Jan. 23, 1941 3 Sheets-Sheet 2
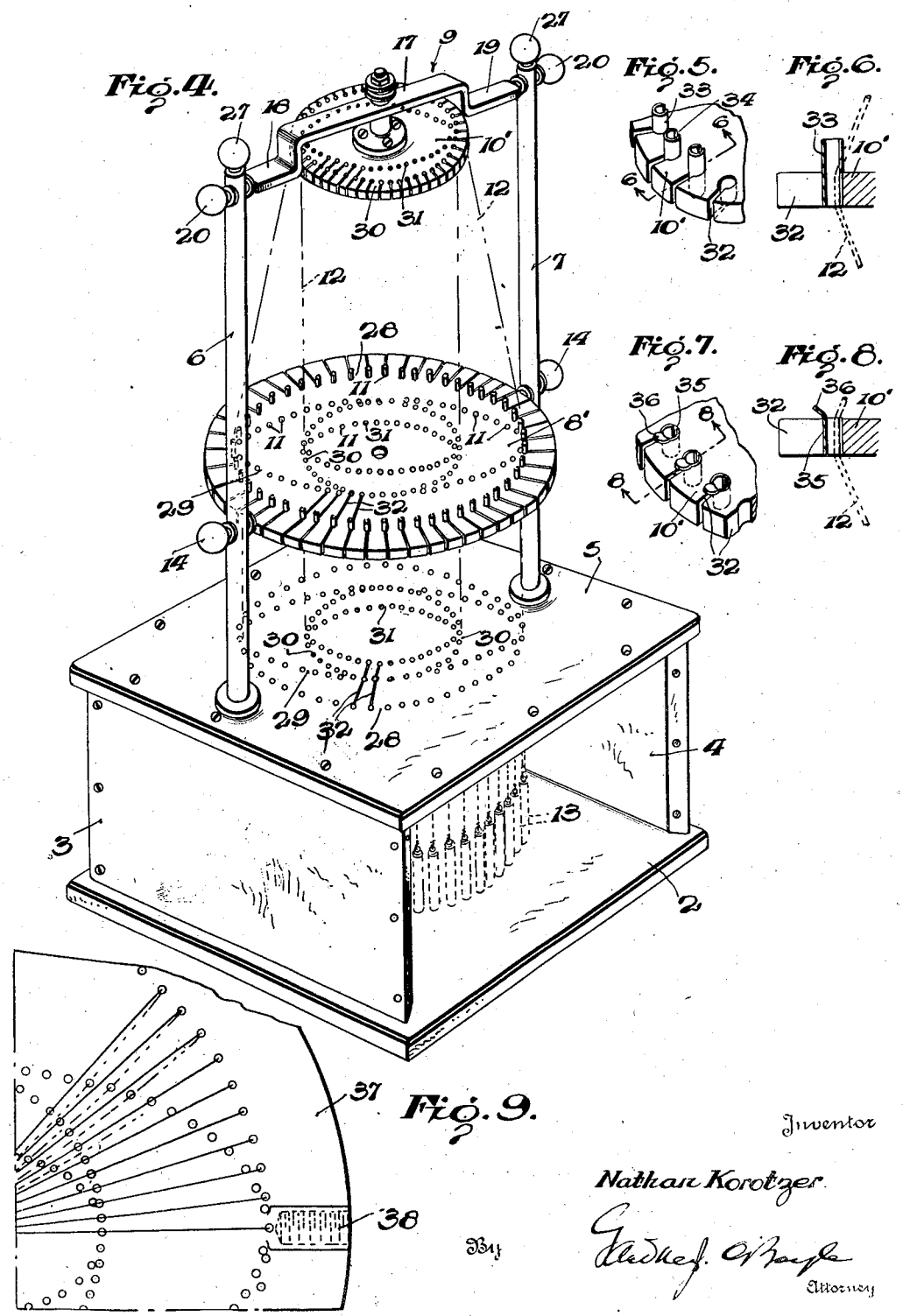
Inventor
Nathan Korotzer.
By
Attorney Feb. 23, 1943.   N. KOROTZER   2,312,175
STRING MODEL OF A FRUSTUM OF A CONE
Filed Jan. 23, 1941   3 Sheets-Sheet 3
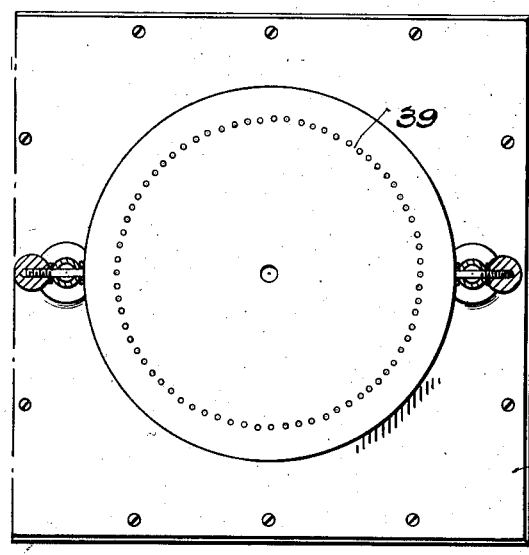
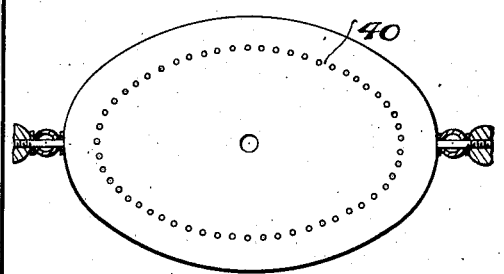
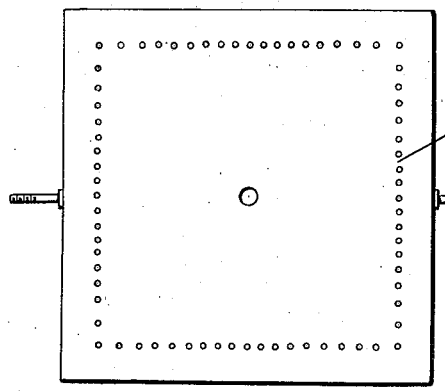
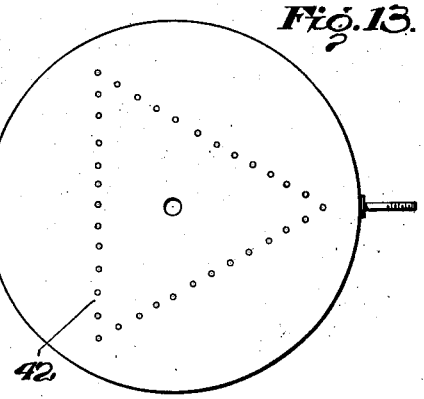
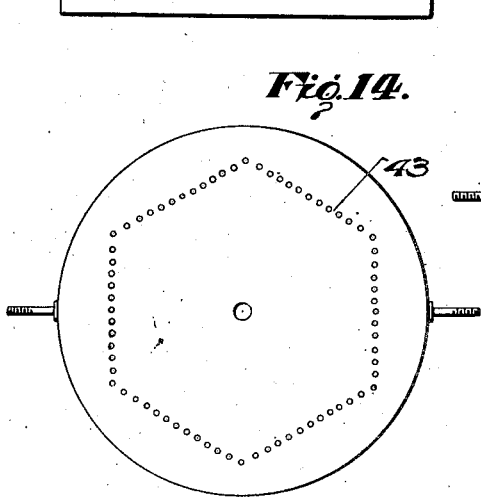
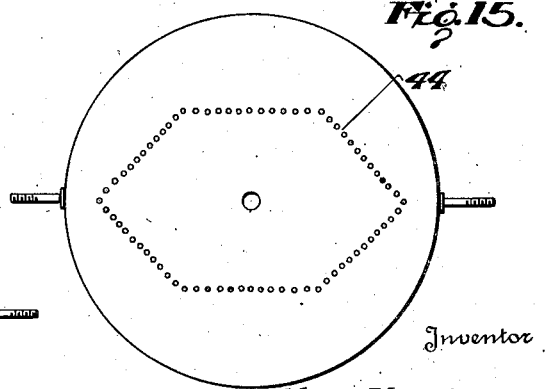
Inventor
Nathan Korotzer
By
Attorney Patented Feb. 23, 1943

2,312,175

UNITED STATES PATENT OFFICE 2,312,175

STRING MODEL OF FRUSTUMS OF CONES

Nathan Korotzer, Brooklyn, N. Y.

Application January 23, 1941, Serial No. 375,671

17 Claims. (Cl. 35—34)

My invention relates to model for educational purposes and more particularly to a string model adapted to illustrate geometric figures and the like.

It will be appreciated that in the study, for example, of plane, solid, analytical and descriptive geometry, considerable difficulty is encountered by students in visualizing the more complicated geometric figures and the relative position of points, lines and planes in space. While the more elementary propositions of plane and solid geometry are susceptible of demonstration by means of simple drawings the advanced theorems in these subjects, and more particularly in solid geometry, which require numerous points and lines not in the same plane, are difficult to illustrate. One of the principal objects of the present invention therefore, is the provision of a model by means of which a plurality of specifically differing geometric figures can be illustrated so that the true position of all points, lines and surfaces which go to make up a particular geometric figure are readily discernible.

Heretofore it has been proposed to provide string models wherein the outlines of the geometric figures which are to be illustrated are obtained by means of flexible members attached to suitable supports which are constructed and arranged to define a geometric figure in the form of a cone, cylinder, pyramid and like polyhedra. In the prior art arrangements, as far as I am aware, the flexible members are attached to the base or frame which is to provide the desired outline, at spaced points thereon and for each individual geometric figure the base must of necessity be rethreaded or strung with the flexible members. In other words, when it is desired to display a cylinder, cone and pyramid the frame structure has to be reassembled for each individual figure or separate frames provided.

After considerable research and experimentation I have found that various geometric figures can be suitably illustrated or displayed by means of a single unit which is constructed and arranged whereby specifically different geometric figures can be obtained by manipulating the elements which support the strings. By means of my improved model it is possible to follow the transition steps in forming warped surfaces such as the conoids, cylindroids and hyperboloids of revolution.

An object of my invention is to provide an improved model adapted to illustrate geometric figures and the like.

Another object of my invention is to provide an improved string model constructed and arranged whereby a plurality of specifically different geometrical figures can be displayed.

Yet another object of my invention is to provide a string model for educational purposes wherein transformation from one geometric figure to another can be made without restringing the model for each individual figure.

Still another object of my invention is to provide an improved string model wherein the development of points, lines and surfaces during transformation from one geometric figure to another can be clearly followed and visualized.

A still further object of my invention is to provide an improved string model constructed and arranged so that the individual strings are maintained taut under substantially uniform tension during movement of the parts of the model used to effect changes in form of geometric figures and the like.

Yet a still further object of my invention is to provide an improved string model having means to automatically compensate for variations in the length of individual strings when transformation from one geometric figure to another are made.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a perspective view of the string model illustrating a frustum of a cone.

Fig. 2 is a perspective view of the model shown in Fig. 1 illustrating an hyperboloid of revolution.

Fig. 3 is an expanded view of the arrangement used to attach the trunnion to its support.

Fig. 4 is a perspective view of a modification of the string model.

Fig. 5 is a fragmentary view of a portion of one of the discs showing the arrangement of the sleeves used with the strings or other flexible members.

Fig. 6 is a single view along line 6—6 of Fig. 5.

Fig. 7 is a fragmentary view of a portion of one of the discs showing a modified form of sleeve.

Fig. 8 is a single view along line 8—8 of Fig. 7.

Fig. 9 is a fragmentary plan view of a modified form of the larger disc, and

Figs. 10 to 15, inclusive, are plan views of lower disc having different geometric figures outlined thereon.

Referring to the drawings and more particularly to Fig. 1, there is shown a string model of a frustum of a cone to illustrate one application or use of the present invention. The model comprises a base designated generally by numeral 1, which may conveniently be in the form of a box-like member having a bottom 2, sides 3 and 4, and a top or cover 5. Suitably attached to the cover member 5 are a pair of vertical members 6 and 7 arranged to support a disc 8 and a trunnion member 9, the trunnion having disc 10 rotatably mounted thereon.

Each of the discs and the cover of the base member is provided with a plurality of openings 11 defining the periphery of a plane geometric figure, in the instant case, a circle. The disc and cover member 5, as shown, are each provided with seventy-two openings angularly spaced through divisions of 5°. Suitable flexible members 12, which may be in the form of thread, cord, wire of small diameter or the like, are threaded through the openings in the manner shown to provide an outline of a frustum of a cone.

In connection with the flexible members, it will be noted that they are arranged in loop formation, that is to say, a single piece of string of required length is threaded through the corresponding openings in the base cover and the discs, the loop portion of the string joining successive openings 11 in the disc 10. In order to maintain the flexible members taut, the free ends thereof are provided with weight members 13, which may be in the form of miniature window weights, as shown. It will be understood of course, that the model way be strung with individual flexible members using a knot or other fastening means for the ends of the members which pass through the openings in the disc 10 and that weight members of different shapes and of various materials may be used.

Reference being had again to Fig. 1, it will be noted that the larger disc 8, is pivotally mounted between the vertical members 6 and 7 by means of strip shafts or other short projection adapted to extend through the vertical members a sufficient distance to receive threaded wing nuts or balls 14, by means of which the angular position of disc 8 with respect to the horizontal can be fixed. Suitable washers 15 and 16 forming bearing surfaces at either side of the vertical members, are positioned adjacent the peripheral edges of the disc and the inner surface of the ball.

The upper disc 10 is mounted for pivotal movement through the medium of the trunnion member 9 and it is also adapted for rotative movement. The trunnion as shown, is formed from strip material having an intermediate portion 17 above the plane of arms 18 and 19, which are formed with threaded reduced portions adapted to enter through suitable openings in the vertical members and receiving balls or other thread members 20, by means of which the angular position of the trunnion can be maintained. Disc member 10, is mounted for rotative movement on trunnion 9 by means of a short shaft having a base 22 attached to the upper surface of the disc by screws 23 or other suitable fastening means. Referring to Fig. 3, it will be noted that the arms 19 of the trunnion member are formed with a threaded reduced portion 25 adapted to pass through an opening 26 formed in the vertical member 7. The reduced portion 25 is of sufficient length to project beyond the outer surface of member 7 to receive washer 16 and ball 14. The opposite end of the trunnion is constructed in the fashion and by means of this arrangement the angularity of the trunnion with respect to the horizontal can be readily fixed. Caps or plug members in the form of balls 27 may be used to close the ends of the vertical members and enhance the general appearance of the supports.

In the use of the model of the frustum of the cone, shown in Fig. 1, when it is desired, for example, to illustrate the formation of an hyperboloid of revolution of one nappe, upper disc 10 is rotated through an angle in the horizontal plane (Fig. 2) the large disc 8 remaining fixed and in a plane parallel to the upper disc. It will be noted that rotative movement of disc 10 exerts a tension or pull on the flexible elements 12, causing the weight members 13 to be raised to the full line position as shown. Attention is called to the fact that the magnitude of the individual weights is of such value as to maintain the strings 12 taut during the transition period, thus enabling one to follow the development from the frustum of the cone shown in Fig. 1 to the hyperboloid of revolution illustrated in Fig. 2. This particular type of surface is of the general class used in the development of the mast used to support the fight top of a battle ship. It is also used in tower and lattice work, gearing and the like.

If the lower disc is moved about its pivotal points so that it assumes a position at some angle to the vertical, the upper disc remaining in its normal position as shown in Fig. 1, the resulting surface is that of a warped cone. This surface is a transition of considerable practical value in the illustration of pipe connections and reducing hoods. Disc 8 is shown in two different positions in Fig. 2 to provide surfaces of warped cones.

It will be appreciated that several specifically different types of surfaces can be generated, using the frustum of the cone as the basic model from which other transitions are effected. For example, the upper base of the frustum may be revolved through an angle in the horizontal plane to form a cone of double nappe. Variations in the warped surfaces and the surfaces of hyperboloids of revolution can be obtained by other combinations or settings of the discs with respect to the horizontal and vertical planes.

Referring to Fig. 4 there is shown a modified form of the model of the present invention, constructed and arranged whereby a plurality of different geometrical figures can be illustrated or displayed. In the arrangement shown, discs 8', 10' and cover member 5 are provided with a plurality of openings to define peripheries of specifically different plane geometrical figures. Disc 8' may, for example, have outlined thereon through the medium of openings 11, a large circle 28 an ellipse 29 and a smaller circle 30 and a small ellipse 31. Disc member 10' may similarly be formed with the outline of a corresponding small circle 30 and small ellipse 31. The top of the box or cover 5 is provided with openings defining the peripheries of one of the figures above referred to in the disc.

Between the peripheries of the concentric figures and along substantially radial lines, the discs and cover member are formed with slits 32 which connect with or join successive openings 11. The purpose of this arrangement is to enable the strings or other flexible members 12 to be moved to successive openings without requiring restringing of the model. For example, assuming that the model is strung to illustrate a regular cylindrical surface and it is desired to change to a frustum of a circular cone, the strings will be moved outwardly along the slitted portions to openings 11, which define the periphery of the large circle 29. The upper base of the required figure will then be the small circle 30 in disc 10' and the large base will be circle 29 of disc 8'.

In order to retain the individual strings 12 in the respective openings 11 defining the peripheries of the plane geometrical figures, that is to say, to prevent the strings from sliding inwardly or outwardly of the discs along the slits which join successive openings, there is provided a plurality of sleeve members 33 adapted to fit into openings 11 and surround the individual flexible elements. As will be seen in Figs. 5 and 6, the sleeve is provided with a slot 34 extending lengthwise thereof, the sleeve being of sufficient length to extend through the disc and beyond its upper surface so that it may be readily grasped and pulled upwardly out of the opening when it is desired to move the string along one of the slits in the disc to another opening 11. It will be understood that after the individual strings have been positioned in the respective openings that the sleeve members may be rotated to bring the slot 34 to a position away from the opening to the slits in the disc member. By means of this arrangement the strings are prevented from moving lengthwise of the substantially radial lines when the disc members are rotated or pivoted in the modification of the surfaces illustrated by the model.

Referring to Figs. 7 and 8 there is shown a modified form of sleeve 35 having lip portion or projection 36 formed thereon. In this arrangement the sleeves are of substantially the same length as the thickness of the individual discs and the lip 36 is provided so that the sleeves may be easily lifted from openings 11. Referring to Fig. 9 there is shown a modified form of disc 37 wherein the openings 11 defining the outermost plane geometrical figure are positioned outwardly of the surface of the disc in line with its pivotal points or vertical members 6 and 7. By means of this construction, considerable saving in manufacturing cost can be effected for the reason that the discs can be internally threaded as at 38 to receive suitable screws adapted to fit into openings formed in the vertical members. This arrangement also enables full use of the area of the disc for a plurality of concentric plane geometrical figures.

It will be appreciated in the use of the model above described that a plurality of different geometrical figures can be illustrated by means of a pair of discs having a combination of different plane geometrical figures defined by the openings through which the flexible members pass. It will be understood that the small circle and small ellipse on the upper disc may be used in any combination with the large circle and large ellipse, small circle and small ellipse on the lower disc and that the small disc can be rotated with combining tilting with this disc and the large disc to form a warped circle, cylinder or a warped cylindroid and various conoids.

Referring to Figs. 10 to 15, inclusive, there is shown a number of different shaped plane geometric figures which may be formed in the disc by means of a plurality of openings to define the peripheries of the respective figures. In Figs. 10 and 11 there is shown a circle 39 and an ellipse 40 respectively and in Figs. 12-15, inclusive, there is shown a plurality of polygons, for example rectangle 41, triangle 42 and hexagons 43 and 44. It will be appreciated that by means of the polygons, various types of polyhedra, for example, prisms, frustum of pyramids, etc., may be illustrated.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A geometric model comprising a base having vertical support members mounted thereon, a disc attached to said support members above the plane of the base, a second disc supported by the vertical members above the first disc, each of said discs having openings therein defining peripheries of plane geometric figures, flexible extendible members connecting the openings of the first disc with the corresponding openings of the second disc and means attached to the flexible extendible members whereby said members are maintained taut under substantially uniform tension.

2. A geometric model comprising a base having vertical support members mounted thereon, a disc pivotally attached to said support members above the plane of the base, a second disc pivotally supported by the vertical members above the first disc, each of said discs having openings therein defining peripheries of plane geometric figures, flexible extendible members connecting the openings of the first disc with the corresponding openings of the second disc and means attached to the flexible extendible members whereby said members are maintained taut under substantially uniform tension.

3. A geometric model comprising a base having vertical support members mounted thereon, a disc pivotally attached to said support members above the plane of the base, a second disc rotatably supported by the vertical members above the first mentioned disc, each of said discs having openings therein defining peripheries of plane geometric figures, flexible extendible members connecting the openings of the first disc with the corresponding openings of the second disc and means attached to the flexible extendible members whereby said members are maintained taut under substantially uniform tension.

4. A geometric model comprising a base having vertical support members mounted thereon, a disc pivotally attached to said support members above the plane of the base, a second disc pivotally and rotatably supported by the vertical members above the first-mentioned disc, each of said discs having openings therein defining peripheries of plane geometric figures, flexible extendible members connecting the openings of the first disc with the corresponding openings of the second disc and means attached to the flexible extendible members whereby said members are maintained taut under substantially uniform tension.

5. A geometric model comprising a base having vertical support members mounted thereon, a disc attached to said support members above the plane of the base, a second disc supported by the vertical members above the first mentioned disc, the base member and each of said discs having openings therein defining peripheries of plane geometric figures, flexible extendible members connecting the corresponding openings in the discs and said base and means attached to the flexible extendible members below the base whereby said members are maintained taut under substantially uniform tension.

6. A geometric model comprising a base having a pair of vertical supports mounted thereon, a disc pivotally mounted between said supports above the plane of the base, a second disc mounted upon a trunnion positioned between the vertical supports above the first mentioned disc, each of said discs having openings therein defining peripheries of plane geometric figures, flexible entendible members connecting the openings of the first disc with the corresponding openings of the second disc and means attached to the flexible extendible members whereby said members are maintained taut under substantially uniform tension.

7. A geometric model comprising a base having a pair of vertical support members mounted thereon, a disc pivotally mounted between said supports above the plane of the base, a second disc positioned above and in spaced relation to the first disc, means to pivotally and rotatably support said disc comprising a trunnion attached to the vertical supports, each of said discs having openings therein defining peripheries of plane geometric figures, flexible extendible members connecting the openings of the first disc with the corresponding openings of the second disc and means attached to the flexible extendible members whereby said members are maintained taut under substantially uniform tension.

8. A geometric model comprising a base having a pair of vertical supports mounted thereon, a disc pivotally mounted between said supports above the plane of the base, a second disc mounted upon a trunnion positioned between the vertical supports above the first mentioned disc, the base member and each of said discs having openings therein defining peripheries of plane geometric figures, flexible extendible members connecting the corresponding openings in the discs and said base, and means attached to the flexible extendible members below the base whereby said members are maintained taut under substantially uniform tension.

9. A geometric model comprising a base having a pair of vertical supports mounted thereon, a disc pivotally mounted between said supports above the plane of the base, a second disc positioned above and in spaced relation to the first mentioned disc, means to pivotally and rotatably support said discs comprising a trunnion attached to the vertical supports, the base member and each of said discs having openings therein defining peripheries of plane geometric figures, flexible extendible members connecting the corresponding openings in the discs and said base, and means attached to the flexible extendible members below the base whereby said members are maintained taut under substantially uniform tension.

10. A geometric model comprising a base having vertical support members mounted thereon, a disc pivotally attached to said support members above the plane of the base, means to maintain the disc in any fixed position within the limits of its pivotal movement, a second disc pivotally supported by the vertical members above the first mentioned disc, means to maintain said second disc in any fixed position within the limits of its pivotal movement, each of said discs having openings therein defining peripheries of plane geometric figures, flexible extendible members connecting the openings of the first disc with the corresponding openings of the second disc and means attached to the flexible extendible members whereby said members are maintained taut under substantially uniform tension.

11. A geometric model comprising a base having vertical support members mounted thereon, a disc pivotally attached to said support members above the plane of the base, means to maintain the disc in any fixed position within the limits of its pivotal movement, a second disc pivotally and rotatably supported by the vertical members above the first mentioned disc, means to maintain the disc in any fixed position within the limits of its pivotal and rotatable movement, each of said discs having openings therein defining peripheries of plane geometric figures, flexible extendible members connecting the openings of the first disc with the corresponding openings of the second disc and means attached to the flexible extendible members whereby said members are maintained taut under substantially uniform tension.

12. A string model of the character described comprising a base having a pair of vertical support members mounted thereon, a disc attached to said members above the plane of the base, a second disc supported by the vertical members above the first mentioned disc, each of said discs having openings therein defining peripheries of a plurality of concentric plane geometrical figures, the corresponding openings of the figures along substantial radial lines being joined by slits formed in the body portion of the discs, extendible string members connecting the openings defining one of the figures in the first disc with corresponding openings defining a figure in the second disc, the individual strings being movable through the slits to successive openings in the discs whereby different geometric figures can be formed without restringing the model, and means to maintain the strings taut under substantially uniform tension.

13. A string model of the character described comprising a base having a pair of vertical support members mounted thereon, a disc pivotally mounted between said supports above the plane of the base, a second disc pivotally supported by the vertical members above the first mentioned discs, a disc attached to said members above the plane of the base, a second disc supported by the vertical members above the first mentioned disc, each of said discs having openings therein defining peripheries of a plurality of concentric plane geometrical figures, the corresponding openings of the figures along substantial radial lines being joined by slits formed in the body portion of the discs, extendible string members connecting the openings defining one of the figures in the first disc with corresponding openings defining a figure in the second disc, the individual strings being movable through the slits to successive openings in the discs whereby different geometric figures can be formed without restringing the model, and means attached to the strings below the base to maintain the strings taut under substantially uniform tension.

14. A string model of the character described comprising a base having a pair of vertical support members mounted thereon, a disc pivotally mounted between said supports above the plane of the base, a second disc pivotally supported by the vertical members above the first mentioned disc, the base member and each of said discs having openings therein defining peripheries of a plurality of concentric plane geometric figures, the corresponding openings of the figures along substantial radial lines being joined by slits formed in the body portion of the base and of the discs, extendible string members connecting the openings defining one of the figures in the first disc with corresponding openings defining a figure in the second disc and in the base member, the individual strings being movable through the slits to successive openings in the discs and in the base whereby different geometrical figures can be formed without restringing the model, and means attached to the strings below the base to maintain such strings taut under substantially uniform tension.

15. A string model of the character described comprising a base having a pair of vertical support members mounted thereon, a disc attached to said members above the plane of the base, a second disc supported by the vertical members above the first mentioned disc, each of said discs having openings therein defining peripheries of a plurality of concentric plane geometrical figures, the corresponding openings of the figures along substantial radial lines being joined by slits formed in the body portion of the discs, extendible string members connecting the openings defining one of the figures in the first disc with corresponding openings defining a figure in the second disc, means to confine the individual strings to openings between slits comprising sleeve members insertable in the openings of the discs, the individual strings being movable through the slits to successive openings in the discs, whereby different geometric figures can be formed without restringing the model and means to maintain the strings taut under substantially uniform tension.

16. A string model of the character described comprising a base having a pair of vertical support members mounted thereon, a disc pivotally mounted between said supports above the plane of the base, a second disc pivotally supported by the vertical members above the first mentioned disc, a disc attached to said members above the plane of the base, a second disc supported by the vertical members above the first mentioned disc, each of said discs having openings therein defining peripheries of a plurality of concentric plane geometric figures along substantial radial lines being joined by slits formed in the body portion of the discs, extendible string members connecting the openings defining one of the figures in the first disc with corresponding openings defining a figure in the second disc, means to confine the individual strings to openings between slits comprising sleeve members insertable in the openings of the discs, the individual strings being movable through the slits to successive openings in the discs, whereby different geometric figures can be formed without restringing the model, and means attached to the strings below the base to maintain the strings taut under substantially uniform tension.

17. A string model of the character described comprising a base having a pair of vertical support members mounted thereon, a disc pivotally mounted between said supports above the plane of the base, a second disc pivotally supported by the vertical members above the first mentioned disc, the base member and each of said discs having openings therein defining peripheries of a plurality of concentric plane geometric figures, the corresponding openings of the figures along substantial radial lines being joined by slits formed in the body portion of the base and of the discs, extendible string members connecting the openings defining one of the figures in the first disc with corresponding openings defining a figure in the second disc and in the base member, means to confine the individual strings to openings between slits comprising sleeve members insertable in the openings of the discs, the individual strings being movable through the slits to successive openings in the disc and in the base whereby different geometrical figures can be formed without restringing the model, and means attached to the strings below the base to maintain such strings taut under substantially uniform tension.

NATHAN KOROTZER.